May 22, 1934.    J. L. SHROYER    1,959,935
HEATER
Filed Oct. 22, 1929
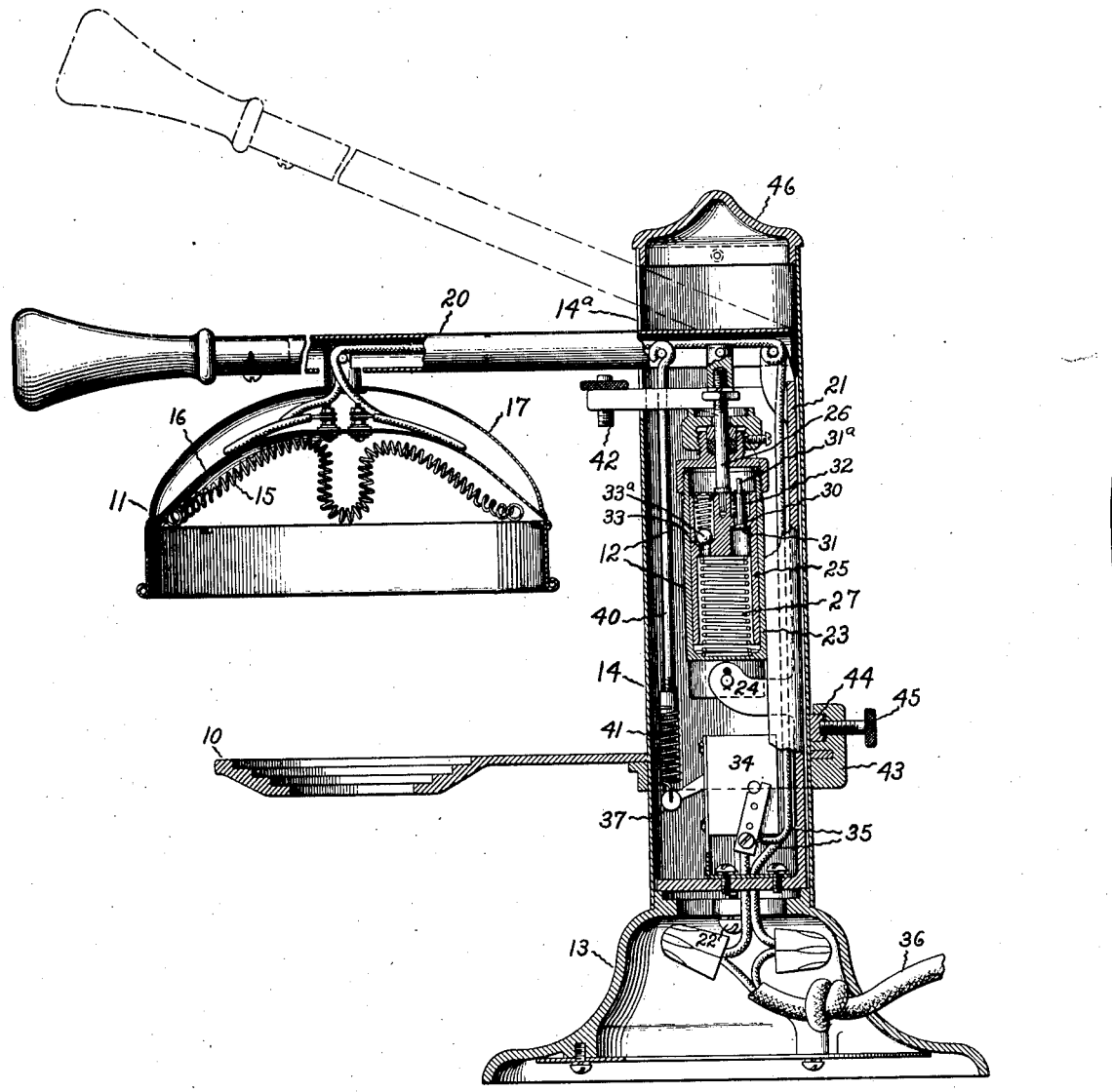
Inventor:
Jacob L. Shroyer,
by Charles E. Tullar
His Attorney Patented May 22, 1934

1,959,935

UNITED STATES PATENT OFFICE 1,959,935

HEATER

Jacob L. Shroyer, Oak Park, Ill., assignor to Edison General Electric Appliance Company, a corporation of New York Application October 22, 1929, Serial No. 401,558

1 Claim. (Cl. 53—5)

My invention relates to heaters, more particularly to heaters of the type wherein edible materials are subjected to a source of heat, and has for its object the provision of an improved electric heater of this character.

Although it is not limited thereto, my invention is particularly useful in connection with the preparation of edibles wherein the edible material is subjected to a baking, browning or like heat treatment. My invention is especially directed to portable electric heaters used in the production of "backed ice cream", meringue pies, au gratin potatoes and similar edible products.

In carrying my invention into effect in one form thereof, I provide a suitable heating unit which is supported so that it may be moved into heating relation with the edibles to be treated. Moreover, I provide suitable means for automatically moving the heating unit away from the edible material upon the completion of the heating operation. Preferably, the heating unit is moved to a remote position with respect to the edible material in response to a time interval.

For a more complete understanding of my invention reference should be had to the accompanying drawing in which the single figure is an elevation in section of an electric heater embodying my invention.

Referring to the drawing, I have shown my invention in one form as applied to a portable electric heater particularly useful in connection with the preparation of edibles. As shown, the electric heater comprises a supporting member 10 upon which the edible to be treated is placed, a suitable movably supported heating unit 11, constituting the source of heat, and controlling means 12 provided to control the movement of the heating unit. A suitable base 13 is provided to support these elements. As shown, a metallic casing 14, preferably of cylindrical form, is mounted upon the base 13. This casing serves to support the edible support 10 and to house the control mechanism 12.

The heating unit, which preferably is of the resistant type, comprises a helically coiled heating resistor 15 mounted in a suitable dome-shaped heat deflecting support. The resistance element is supported directly by a heat deflecting plate 16 which preferably is formed from a suitable electrical and heat insulating material such as porcelain. This plate in turn is supported by an outer metallic shell or guard 17. As shown, the resistance element 15 is supported in a plurality of loops, which cover a relatively large area of the deflecting surface of the plate 16.

The heating unit 11 is pivotally mounted upon a supporting and operating arm 20 which also is pivotally mounted so that the heating unit as a whole may be moved toward the support 10 to a position in heating relation therewith, in which position it is shown in the drawing, and so that it may be moved away from the support to a remote position, which is indicated in the drawing by the dotted position of the arm 20. As shown, the arm 20 is pivotally mounted upon a supporting frame 21 which is detachably secured to the base 13, by means of suitable screw fastening means 22. The upper portion of the cylinder is provided with a slot 14a which serves to receive the arm 20 so as to permit its motion to and from the support 10.

I control the movement of the operating arm and thus the movement of the heating unit away from the support 10 responsively to a predetermined time interval and moreover, control the energization of the heating resistor responsively to the motion of the operating arm so that the resistor will be energized when the unit is moved to its heating position with respect to the support and will be deenergized when the unit is moved away from the support to its remote position.

As shown, I provide a suitable dash-pot retarding and timing mechanism. This dash-pot, which preferably will be of the fluid type, comprises a cylinder 23 pivotally mounted to the projecting arms 24, provided on the supporting frame 21, a piston 25 connected to the operating arm 20 by means of a piston rod 26, and an actuating spring 27. This spring is shown to be of the compression type and is positioned between the lower cylinder head and the lower surface of the piston 25 so that the force exerted by the spring tends to move the piston upwardly, as viewed in the figure, and consequently tends to move the operating arm in a clockwise direction. It will be understood that the cylinder 23 is filled with oil or some similar suitable fluid both above and below the piston, and that this fluid serves to retard the upward movement of the piston. As shown, the piston is provided with a suitable port or passageway 30 leading from the lower to the upper face of the piston. This passageway is provided with a downwardly opening valve 31, which is biased to its closed position by means of a compression spring 32. It will be observed that by reason of this construction the piston 25 will be allowed to move upwardly under the influence of the spring 27 since the fluid above the piston will flow downwardly through the passageway 30 to the lower portion of the cylinder. Moreover, it will be observed that the piston will be moved upwardly at a rate determined by the strength of the spring 27 and the leakage past the valve 31.

To permit practically free movement of the piston downwardly within the cylinder so that the heating unit may be moved readily into its heating position, the piston is provided with a second valved passageway 33. As shown, the valve 33a, provided in this passageway, opens in an upward direction rather than in a downward direction as does the valve 31. It will be observed that the arm 20 may be moved readily to its lower position by reason of this valve construction in that as the piston is moved downwardly in its cylinder the valve 33a will be lifted from its seat, thereby permitting the oil to flow freely through the port 33 from the lower to the upper portion of the cylinder. Preferably although not necessarily so, the valve 33a will be of the ball type.

It is desirable to retard the initial motion of the heating unit away from the support 10 to a considerable extent and thereafter, permit the arm to move rapidly to its remote position. Thus, it is desirable to hold the heating unit in its heating position until the heating operation has been substantially completed. To control the operating arm 20 so as to give the motion of the heating unit the above desired characteristics, I provide the valve 31 with a comparatively long valve stem or rod 31a. As shown, this rod projects considerably above the upper surface of the piston. It will be observed that when the piston has been moved upward a distance sufficient to cause the valve rod to engage the upper cylinder head, the valve will be opened and thereby permit the oil to flow freely from the upper to the lower portion of the cylinder. As a result of this operation the piston will be moved upward quickly under the influence of its actuating spring 27. Thus, the piston during the initial portion of its upward movement will be retarded while during the final portion of this movement it will be moved rapidly to its upper position.

In order to control the energization of the heating resistor so that it will be energized when the heating unit is moved to its heating position and will be deenergized when the unit is moved to its remote position, I provide a suitable control switch 34 which is operated responsively to the motion of the operating arm 20. As shown, this switch 34 is interposed in the electrical connections 35 leading from the twin supply conductor 36 to the heating resistor. This switch is provided with an operating arm 37 which when moved to its lower position, as shown in the drawing, closes the switch so as to effect an energization of the heating resistor and when moved to its upper position opens the switch so as to effect a deenergization of the heating resistor. As shown, this switch arm 37 is mechanically connected with the operating arm 20 by means of a rod 40 and a compression spring 41, this spring being interposed between the arm 37 and the lower end of the rod 40. It will be understood that this spring serves to protect the switch since its arm 37 has a definite limited motion. Preferably, the switch arm 37 will be connected with the arm 20 so that the switch will be closed before the lever 20 reaches its ultimate lower position and will be opened before the arm 20 reaches its ultimate upper position. This eliminates any error in timing due to variation in switches. It is believed unnecessary for a proper understanding of this invention to describe in detail the construction and arrangement of this switch since any preferred well-known form may be used.

In the operation of the heater it will be understood that the edible to be treated will be placed upon the support 10 and that the arm 20 will be moved to its lower position shown in the drawing, so as to bring the heating unit to its heating position with respect to the edible. This downward movement of the arm 20 also serves both to close the switch 34 to effect an energization of the heating resistor 15 and to compress the actuating spring 27. When the arm 20 is released it will be moved upwardly under the influence of the spring 27 to move the heating unit toward its remote position. The rate at which the heating unit is moved away from the support 10 depends upon the strength of the spring 27 and the rate at which the oil is permitted to flow from the upper portion of the cylinder through the piston port 30 to the lower portion of the cylinder. The arm will thus be retarded until the valve rod 31a has engaged the upper cylinder head after which the unit will be moved rapidly to its remote position. Another portion of the material to be treated may then be placed upon the support 10 and the previously described operation repeated, i. e., the arm 20 will be brought to its lower position to bring the heating unit in heating relation with the material after which the arm will be moved to its remote position by its actuating and timing mechanism.

It is, of course, desirable at times to change the timing period. For this purpose, I have provided a suitable timing adjusting screw 42 which serves to limit the downward movement of the arm 20. Thus, the heating unit may be moved to various heating positions so that the retarded portion of its path of movement and consequently the time it remains in its heating position may be suitably varied. To accommodate the support 10 to these adjustments it is itself adjustably mounted upon the cylindrical casing 14. As shown, the support 10 is provided with a supporting collar 43 which surrounds the cylindrical casing 14 and is secured thereto by means of a pressure saddle 44 forced inwardly against the outer surface of the casing by means of a suitable set screw 45. Should the screw 42 be screwed upwardly, as viewed in the figure, so as to change the heating position of the heating unit, the support 10 likewise may be moved upwardly so that the material placed thereon will be subjected to the same heat intensity. Moreover, the supporting means provided for the support 10 permits it to be adjusted laterally with respect to the heating unit so that the articles may be conveniently placed thereon and removed therefrom.

An important feature of my invention is the provision for a ready removal of the heating unit and for a ready removal of the operating elements provided for the unit. Thus, it will be observed that the framework 21 serves to support the arm 20 and consequently the heating unit, the timing mechanism and the control switch as a unitary structure. This framework which is secured to the base 13 by means of the screw fastening means 22 is readily removable. It will be observed that by reason of this construction, to remove the entire mechanism is but necessary to unscrew the members 22, detach the leads 35 and withdraw the whole mechanism through the top of the casing. The casing is provided with a cover 46 which normally closes the mouth of the casing.

What I claim as new and desire to secure by Letters Patent of the United States is:

An electric heater comprising a base, a casing mounted on said base, a support mounted on the exterior of said casing, a supporting frame within said casing detachably secured to said base, an arm, means pivotally connecting said arm to said supporting frame, said arm extending outwardly from said casing so that it can be rotated on said pivotal connection, a heating element carried by said arm so that it is in heating relation with said support in one position of said arm and is remote therefrom in another position of said arm, a spring within said casing mounted on said frame and operably associated with said arm so that when said arm is moved to said one position said spring is compressed so as to tend to return said arm to said other position, and a dash pot within said casing mounted on said frame and operably associated with said arm so as to retard its motion to said other position, said dash pot operating to control said motion so that said arm is moved at a comparatively slow rate until it has been moved a predetermined distance toward said other position after which it is rapidly moved to said other position.

JACOB L. SHROYER.